United States Patent [19]
Betker et al.

[11] Patent Number: 6,092,186
[45] Date of Patent: *Jul. 18, 2000

[54] APPARATUS AND METHOD FOR ABORTING UN-NEEDED INSTRUCTION FETCHES IN A DIGITAL MICROPROCESSOR DEVICE

[75] Inventors: Michael Richard Betker; Trevor Edward Little, both of Allentown, Pa.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/646,159

[22] Filed: May 7, 1996

[51] Int. Cl.[7] ........................................ G06F 13/00

[52] U.S. Cl. .................. 712/233; 712/205; 712/207; 712/234; 712/235; 711/150; 711/152; 711/167; 711/169; 710/22; 710/23

[58] Field of Search ..................... 395/376, 590, 395/383, 582, 584, 381, 384, 580, 581; 712/233, 205, 207, 234, 235; 711/169, 167, 152, 150; 710/23, 22

[56] References Cited

U.S. PATENT DOCUMENTS

| | | | |
|---|---|---|---|
| 4,450,519 | 5/1984 | Gutag et al. ............................. | 364/200 |
| 4,682,284 | 7/1987 | Schrofer ................................. | 364/200 |
| 4,703,420 | 10/1987 | Irwin ..................................... | 395/293 |
| 4,742,451 | 5/1988 | Bruckert et al. ....................... | 364/200 |
| 4,742,454 | 5/1988 | Robinson et al. ..................... | 364/200 |
| 4,763,253 | 8/1988 | Bluhm et al. .......................... | 364/200 |
| 4,791,557 | 12/1988 | Angel et al. ........................... | 395/383 |
| 4,796,175 | 1/1989 | Matsuo et al. ......................... | 395/383 |
| 4,910,657 | 3/1990 | Yoshida ................................. | 364/200 |
| 5,099,419 | 3/1992 | Nomura ................................. | 395/376 |
| 5,155,818 | 10/1992 | Stein et al. ............................. | 395/376 |
| 5,210,867 | 5/1993 | Barlow et al. ......................... | 395/575 |
| 5,479,616 | 12/1995 | Garibay, Jr. et al. .................. | 395/376 |
| 5,515,521 | 5/1996 | Whitted, III et al. .................. | 395/403 |
| 5,537,559 | 7/1996 | Kane et al. ............................. | 395/376 |
| 5,561,814 | 10/1996 | Glew et al. ............................. | 395/833 |
| 5,564,028 | 10/1996 | Swoboda et al. ...................... | 395/568 |
| 5,606,675 | 2/1997 | Sakamura et al. ..................... | 395/584 |
| 5,623,615 | 4/1997 | Salem et al. ........................... | 395/585 |
| 5,634,103 | 5/1997 | Dietz et al. ............................ | 395/582 |
| 5,634,136 | 5/1997 | Oshima et al. ........................ | 395/800 |
| 5,701,433 | 12/1997 | Moriarty et al. ...................... | 395/481 |
| 5,706,466 | 1/1998 | Dockser ................................. | 711/125 |
| 5,724,566 | 3/1998 | Swoboda ............................... | 395/595 |

*Primary Examiner*—Zarini Maung
*Assistant Examiner*—Saleh Najjar

[57] ABSTRACT

The present invention minimizes unneeded memory accesses by providing a digital processor having control circuit for terminating on-going memory accesses, and by a data transfer circuit that allow jump instructions to be detected sooner in the decode unit. The digital processor includes a decode unit, fetch unit and a memory controller. When the decode unit of the present invention processor determines that a discontinuity must occur in the instruction fetch sequence, it asserts a "jump taken" signal to the fetch unit to indicate that any pre-fetched instruction codes are to be discarded and that fetching is to resume at a new fetch program counter (FPC) value. If the fetch unit is currently stalled because of an outstanding request to the memory controller unit, then the fetch unit asserts an "abort" signal to the memory controller. The memory controller unit interprets the abort signal to mean that the current memory access activity is to be terminated as soon as possible, such that aborting the current operation does not corrupt the stored content of the memory element. In addition to the abort signal, the memory controller unit may assert A "partial-done" signal that informs the fetch unit that some fraction of the current request has been completed. The size of the fractional data made available to the fetch unit will correspond to some size or alignment criteria such that the fetch unit may then be able to forward one instruction code to the decode unit. If the forwarded instruction is a "taken" jump, then the decode unit will be able to abort the current fetch request sooner than if it had to wait for the full request to be satisfied.

20 Claims, 6 Drawing Sheets

TWO MEMORY ACCESS; ABORT DE-ASSERTED.

ABORT ASSERTED BEFORE MEMORY ACCESS STARTS.

ABORT ASSERTED DURING ACCESS TO UN-INTERRUPTIBLE MEMORY DEVICE.

ABORT ASSERTED DURING ACCESS TO INTERRUPTIBLE MEMORY DEVICE.

APPARATUS AND METHOD FOR ABORTING UN-NEEDED INSTRUCTION FETCHES IN A DIGITAL MICROPROCESSOR DEVICE

FIELD OF THE INVENTION

This invention relates generally to digital data processors, and more particularly, to a method and apparatus for loading instructions from a memory element to the instruction decode element of such processors.

BACKGROUND OF THE INVENTION

The basic components of a traditional data processing system include a digital processor element and a memory element, connected together by one or more buses. The data stored in the memory element is addressed by location. The memory may contain instructions that the processor is to execute, as well as the operands upon which the processor is to execute the instructions.

The processor is typically divided into two sub-elements, namely an instruction decode element and an instruction execution element. The instruction decode element causes data to be transferred to it from the memory element, which data it interprets as encoded instructions, or code. As directed by the instruction decode element, the instruction execution element may cause data to be transferred to and from the memory element, this data being interpreted as the operands upon which logical operations are to be performed.

The instruction decode element may be further divided into specialized functional units, where the basic units of an instruction decode element of a prior art instruction decode element include a decode unit, a fetch unit to take instruction fetch requests from the decode unit, and a memory controller unit that takes memory fetch requests from the fetch unit and generates specialized signals needed to operate the memory element. Each unit receives as input an "address" signal, and a "request" signal indicating that the instruction code at that address is to be returned. Each unit outputs a "done" signal that informs the requesting unit that the current request has been performed, and that the corresponding instruction code is available on the "data" signal. The instruction codes extracted from the memory element are accumulated by the memory controller in registers, then passed back to registers in the fetch unit, and finally passed back to registers in the decode element.

In many systems, the functional units operate together in a pipelined fashion, such that each one unit performs a particular step in the process required to complete a code fetch, and at any given time, each unit may be operating on an independent and distinct code fetch. Typically the pipeline units operate synchronously with respect to a global clock signal, having a constant period or cycle time. The units may require a different number of clock cycles to complete their functions, depending on the complexity of the function or some physical limitation of the operation. For example, the fetch unit may only require one clock cycle to respond to a fetch request from the decode unit, whereas the memory element may require many clock cycles to process a new address and return the appropriate data. When a unit is unable to respond to a request it is said to be "stalled".

Most instruction codes contain no information regarding the location of the next instruction to be executed. A convention is followed whereby such codes are fetched in a simple sequential order that corresponds to adjacent placement within the memory element. A dedicated address register in the decode unit, commonly called the program counter (PC) increments by some amount each time one of these instructions is decoded; the new value being the address of the next instruction requested from the fetch unit. This makes pipelining of instruction requests particularly effective since the fetch unit can anticipate future requests from the decode unit by simply incrementing the address value stored in its local fetch program counter (FPC) register. The fetch unit can therefore make speculative requests for instruction data before it is known to be needed.

A certain class of instructions cause the PC register to be loaded with a value that is different from the value that would have been obtained by incrementing it. These are commonly referred to as "jump" (or "branch") instructions. A jump instruction will cause a discontinuity in the sequential fetching of instructions codes. The discontinuity reduces the efficiency of the instruction decode element because some of the instruction data speculatively fetched by the fetch unit will not be used. Also, the performance of the instruction decode element is reduced because the decode unit must wait while the fetch request for the first instruction in the new instruction sequence is processed by the pipeline. Some jump instructions that are conditional may not actually cause a discontinuity in the fetch sequence, but may introduce stalled cycles while the jump condition is resolved. Other jump instructions introduce stalled cycles while the decode unit obtains necessary information from the execution element.

U.S. Pat. No. 4,742,451, issued to William F. Bruckert, et al, on May 3, 1988, discloses a modification to the basic pipelined decode element in which the time delay between detection of a conditional jump in the decode stage, and the delivery of the next instruction after the jump instruction is reduced. In the Bruckert patent, when a conditional branch instruction reaches the decode unit, the pipeline will contain instructions beyond the conditional branch, referred to as the "not taken" sequence. Since the decode unit does not immediately know the outcome of the branch condition, it initiates a fetch to the first instruction of the "taken" sequence using a second hardware resource, the operand fetch unit.

The timing of the operand fetch from the memory unit is controlled such that the decode unit will have resolved the branch condition by the time that the first "taken" sequence instruction is available to be latched in the instruction queue. If the decode unit determines that the branch is to be taken, it de-asserts an ABORT signal, allowing the first "taken" branch instruction to be loaded into the instruction register, thereby overwriting the previously saved instruction from the "not taken" sequence. However, if the decode unit determines that the branch is not to be taken, it asserts an ABORT signal to prevent the first "taken" branch instruction from being loaded into the instruction latch. It is characteristic of the apparatus described in U.S. Pat No. 4,742,451 to Bruckert that a memory access to the address of the instruction at the beginning of the "taken" sequence will be initiated and completed for every executed branch instruction. Also, the ABORT signal is only used to enable or disable the latching of a new instruction code in the decode element. Thus, un-needed memory accesses which translate to wasted clock cycles are still performed when using the Bruckert scheme. Accordingly, there is a need for a system in which wasted clock cycles consumed by unneeded memory accesses are minimized over the prior art.

SUMMARY OF THE INVENTION

The present invention minimizes unneeded memory accesses by providing a digital processor having control means for terminating on-going memory accesses, and by data transfer means that allow jump instructions to be detected sooner in the decode unit. The digital processor includes a decode unit, fetch unit and a memory controller. When the decode unit of the present invention processor determines that a discontinuity must occur in the instruction fetch sequence, it asserts a "jump taken" signal to the fetch unit to indicate that any pre-fetched instruction codes are to be discarded and that fetching is to resume at a new fetch program counter (FPC) value. If the fetch unit is currently stalled because of an outstanding request to the memory controller unit, then the fetch unit asserts an "abort" signal to the memory controller. The memory controller unit interprets the abort signal to mean that the current memory access activity is to be terminated as soon as possible, such that aborting the current operation does not corrupt the stored content of the memory element.

In addition to the abort signal, the memory controller unit may assert a "partial-done" signal that informs the fetch unit that some fraction of the current request has been completed. The size of the fractional data made available to the fetch unit will correspond to some size or alignment criteria such that the fetch unit may then be able to forward one instruction code to the decode unit. If the forwarded instruction is a "taken" jump, then the decode unit will be able to abort the current fetch request sooner than if it had to wait for the full request to be satisfied.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

Although the present invention is described with reference to a specific embodiment of a digital microcontroller, it would be understood that the present invention may be adapted for use with other digital processing devices having comparable hardware capabilities, including microprocessors, microcontrollers and digital signal processors. All such variations are intended to be included within the scope of the present invention.

The present invention is particularly directed towards digital processing systems comprised of a high performance digital processor element connected to a low performance memory element. Systems of this type arise in applications that are constrained to be either low cost, or to be low power by virtue of being battery driven portable applications. One example of the latter would be a hand-held cellular phone terminal. The memory element in such a systems may have a relatively low performance either because the data transfer bus has only a few conductor lines, or because a low operating voltage is used that degrades the access time specification of the memory device. In such a system, the access delay to the memory element dominates the performance of the instruction decode pipeline, and it will be directly responsible for many stalled cycles.

Figure 1:
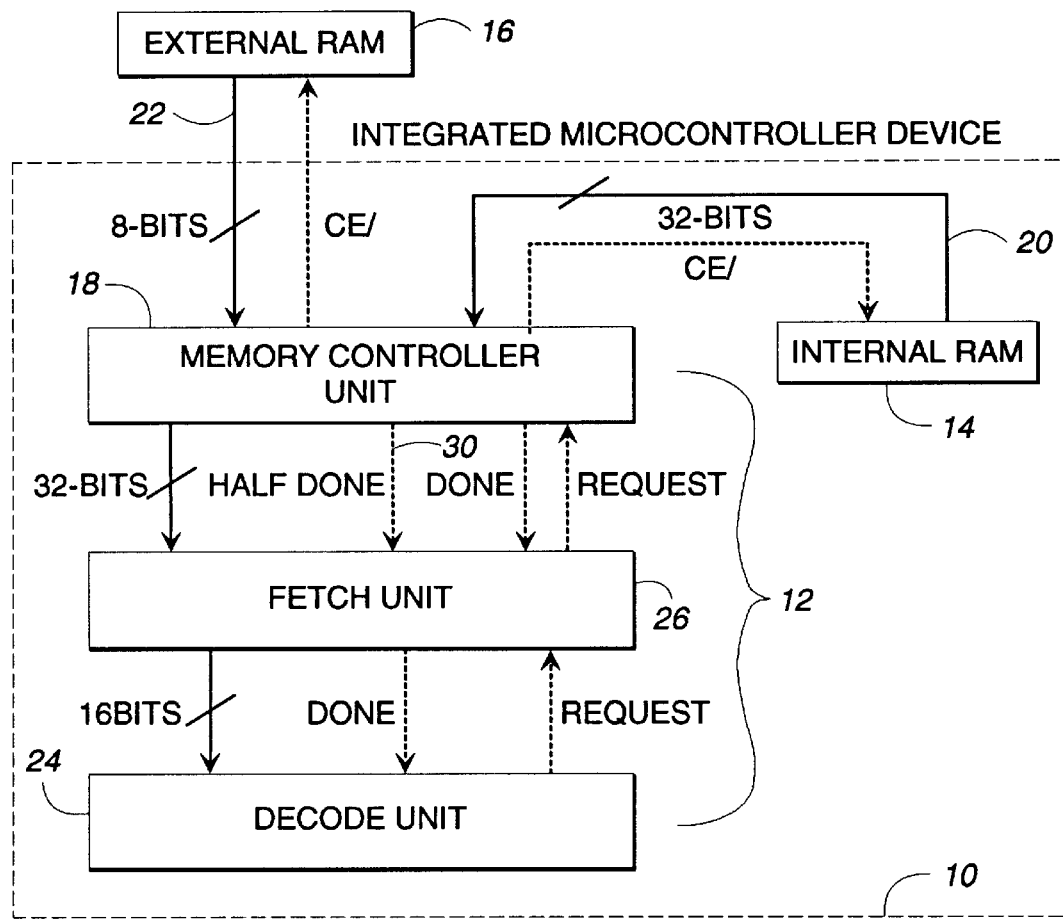
FIG. 1 illustrates an integrated microcontroller system with an external memory element.

To better understand this system organization, reference is made to FIG. 1 which shows one embodiment of the instruction decode apparatus of a microcontroller device 10 according to the present invention. As shown, FIG. 1 includes an instruction decode element 12, a 32-bit wide internal random access memory (RAM) 14, and an 8-bit wide external RAM device 16. A memory controller unit 18 transfers data from the internal RAM 14 (or other memory device) over a 32-bit bus 20, and from the external RAM over an 8-bit bus 22 that passes through pins on the microcontroller device package.

The illustrated microcontroller device 10 contains a high performance processor element and a high performance RAM element. The low cost and low delay penalty of inter-chip wiring make it possible to transfer 32-bits of instruction data from the internal RAM 14 during each clock cycle. Thus, certain tasks, that only involve interaction between the processor and the internal RAM may be performed at a measurably high rate.

Most applications will require more memory space than can be economically placed on the same device as the processor element, and this memory space will be contained in an external memory element. A low cost integrated microcontroller offering many functions in a package with one hundred pins or less will typically dedicate just 8 pins for transferring data from the external memory element. Data transfers between separate devices are subject to the physical delays of signal buffering to drive relatively high inter-chip wiring capacitance. Additionally, an external memory device with a much higher storage capacity than the internal RAM will have a longer access time specification, perhaps from two to eight times the minimum clock interval of the processor element. Accordingly, tasks that require inter-action between the processor element and the external RAM will be performed at a measurably lower rate, but that rate will presumably be sufficient to satisfy the intended application.

For illustrative purposes the decode unit 24 operates on 16-bit fixed length instruction codes. A 32-bit data value contains two instruction codes, which may be distinguished as the "high" instruction and the "low" instruction, based on comparison of the addresses needed to select each 16-bit quantity. The decode unit 24 will request 16-bit data quantities from the fetch unit 26. The fetch unit 26 is designed to request the largest data quantity that the memory controller can obtain in one clock cycle; in this case the internal RAM 14 can return a 32-bit data quantity in one clock cycle. For instructions stored sequentially in the internal RAM the fetch unit 26 can supply the decode unit 24 with the data for one instruction per clock cycle, while causing the memory controller 18 to access the internal RAM 14 every other cycle.

The fetch unit 26 does not know whether the instruction code requested by the decode unit 24 is located in the internal RAM 14 or the external RAM 16. Therefore, the fetch unit 26 must always request 32-bits of data from the memory controller unit 18 in order to take advantage of the higher performance of the internal RAM. If the data requested by the fetch unit is located in the external RAM 16, then the memory controller unit 18 will automatically perform four separate 8-bit memory accesses. For illustrative purposes each of these accesses will take six clock cycles, with one extra cycle between each access. As the four external accesses are being made the memory controller will aggregate the requested data into a 32-bit quantity in preparation for transfer to the fetch unit when the done signal is asserted.

In the illustrative example, after thirteen clock cycles the memory controller 18 will have received 16-bits of code data from the external memory, and provided that the memory is accessed in the correct order, that code data will be the next instruction requested by the decode unit 24. At this point the memory controller will assert a "half-done" signal 30 to the fetch unit 26 and make available the 16-bit instruction code on the data transfer bus. It would continue to fetch the other 16-bits of data to complete the fetch request. Upon receiving the "half-done" signal 30, the fetch unit 26 could transfer the first instruction code to the decode unit, where it will be decoded. If the instruction is found to be a taken jump, then the decode unit 24 will inform the fetch unit 26 that any outstanding memory accesses are unnecessary, and that the instruction fetching is to be restarted at a new PC address. By receiving the first instruction code early, the memory accesses to obtain the second instruction code may be aborted, possibly saving several clock cycles in which the instruction fetch pipeline would otherwise be stalled.

Figure 2:
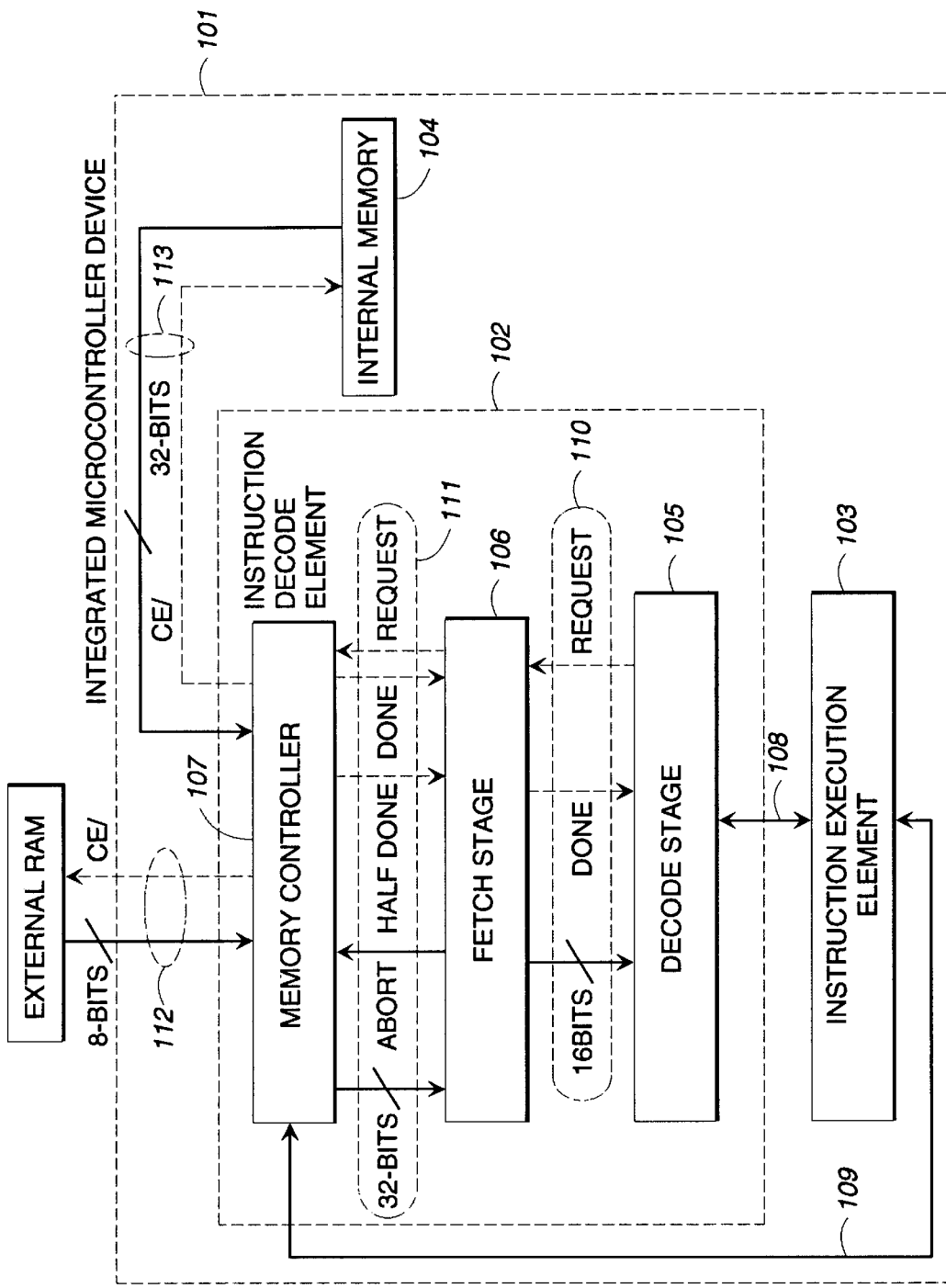
FIG. 2. illustrates one advantageous embodiment of an integrated microcontroller according to the present invention.

Referring to FIG. 2, there is shown a more detailed embodiment of an integrated microcontroller device 101 of the present invention consisting of an instruction decode element 102, instruction execution unit 103, and internal memory 104. The instruction decode element 102 consists of decode stage 105, fetch stage 106, and memory controller 107. Interface 108 between the decode stage 105 and the instruction execution element 103, and interface 109 between the instruction execution element 103 and the memory controller 107 are not detailed in this description. It should be noted however that memory controller 107 takes requests from both the fetch stage 106 and the instruction execution element 103. Arbitration is done in memory controller 107 in a standard manner consistent with prior art. Further descriptions of memory controller 107 do not include the control means associated with interface 109.

Figure 3:
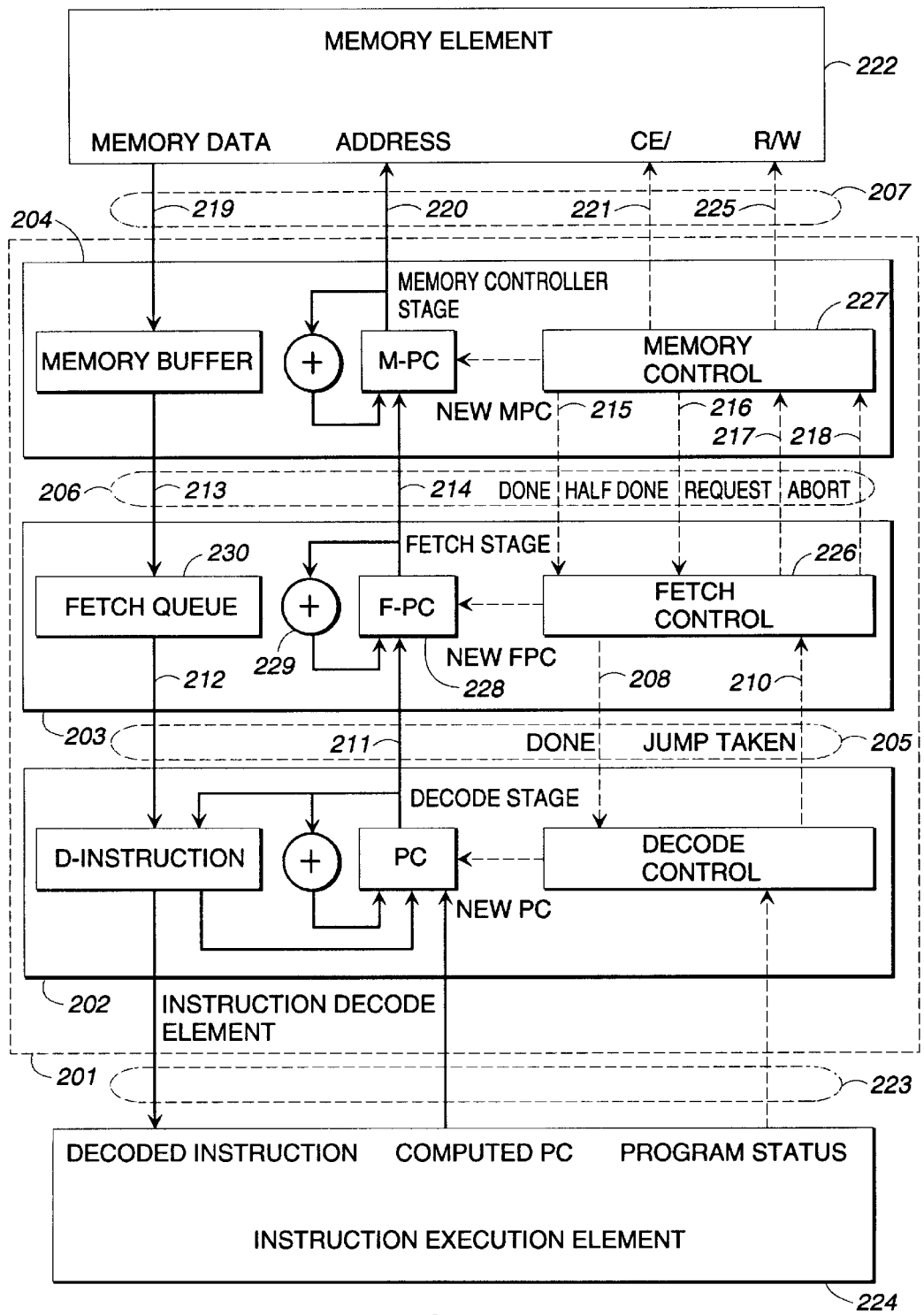
FIG. 3. illustrates one advantageous embodiment of the instruction decode element according to the present invention.

Interfaces 110, 111, and 112 are described in detail in reference to FIG. 3. Interface 113, along with internal memory 104 are shown to highlight that this invention applies to both internal and external memories.

Referring to FIG. 3, there is shown a more detailed illustration of an instruction decode element 201 according to the present invention. Decode stage 202 interfaces to the instruction execution element 224 through interface 223, and the fetch stage 203 through interface 205. Interface 205 consists of an instruction bus 212, next PC field 211, a jump taken signal 210, and a fetch stage done signal 208. The decode stage 202 initiates a new sequence of instructions by asserting the jump taken signal 210 concurrent with the initial address of the sequence being driven on the next PC field 211. The fetch stage 203 responds to this by initiating a memory request to the memory controller 204 through interface 206. The fetch stage 203 may not initiate a new request while the memory controller 204 is still acting upon a previous request. A previous request may be satisfied in this case through a normal completion of the previous memory request or through the abort mechanism embodied in this invention. In either case, the data returned to the fetch stage 203 will be ignored and a new request will be initiated by the fetch stage 203 through interface 206 to the memory controller 204.

Interface 206 consists of a 32-bit wide data bus 213, a 24-bit wide address bus 214, a memory request signal 217, a done signal 215, half done signal 216, and an abort signal 218. The fetch stage 203 initiates a request to the memory controller 204 by asserting the request signal 217 concurrent with driving the memory address in the fetch stage PC (fpc) onto address bus 214. In the preferred embodiment the least significant bit, bit 0, of address bus 214 is always 0 since instructions are always aligned to even address boundaries. Bit 1 of address bus 214 determines the size of the memory request. A value of 0 for bit 1 corresponds to a 4 byte request and a value of 1 corresponds to a 2 byte request. The memory controller 204 responds to a request by performing the required number of memory accesses across interface 207 to memory element 222. It should be noted that memory element 222 could actually consist of one or more memory devices, with each memory device potentially a different type of memory (ROM, SRAM, DRAM, . . . ).

Interface 207 consists of an 8 bit data bus 219, a 24 bit address bus 220, an active-low chip enable 221, and a read/write signal 225. The size of the data bus and address bus could actually be different in other embodiments of this invention and there could be more than one chip enable signal, with each controlling a particular set of memory devices. A 2 or 4 byte memory request is satisfied through a sequence of memory accesses. Each access starts when the address bus 220 is set to the desired address and the read/write signal 225 is set to 1 for a read. The chip enable signal 221 is then asserted for a duration long enough to assure valid data is available from memory element 222 on data bus 219. The memory access is terminated when the value on data bus 219 is latched in the memory controller 204 and the chip enable signal 221 is de-asserted. When the fetch stage 203 makes a 4 byte request the memory controller 204 will assert the half done signal 216 when the first 2 bytes are available on data bus 213. At this time the fetch stage 203 may make those first two bytes available on instruction bus 212 while the final 2 bytes are accessed. It is possible that the first two bytes could contain a taken jump instruction which could end up causing an abort of the fetch of the final 2 bytes. For both 2 and 4 byte requests the memory controller 204 will assert the done signal 215 when all of the bytes requested are available on data bus 213.

When the decode stage 202 requests the start of a new sequence of instructions by asserting the jump taken signal 210, the fetch control block 226 of the fetch stage 203 will respond by asserting the abort signal 218 if there is an outstanding request to the memory controller 204. The fetch control 226 will still wait until the done signal 215 is asserted by the memory control block 227 of the memory controller 204.

The memory control block 227 responds to the assertion of the abort signal 218 by terminating the active memory access on interface 207, if the access is to an interruptible memory device. The memory access is terminated in a manner which will not corrupt the memory element 222. The memory controller 204 will then bypass any remaining memory accesses required to satisfy the current request. The value on the data bus 213 need not be valid data since it will not be used by the fetch stage 203. Finally, the done signal 215 will be asserted, signaling the fetch stage 203 that it may initiate a new access at the initial address of the new instruction sequence. Upon fetching a new instruction, the fetch stage 203 will assert the done signal 208 to the decode stage 202, allowing the new instruction to be decoded for subsequent execution.

It should be noted that a part of this invention is the inclusion of the half done signal 216 which will allow a discontinuity in the first 2 bytes of a 4 byte request to initiate an abort sequence for the remainder of the 4 byte request. The decode stage 202 is consistent with prior art and appears in this description to provide the proper context.

Figure 4:
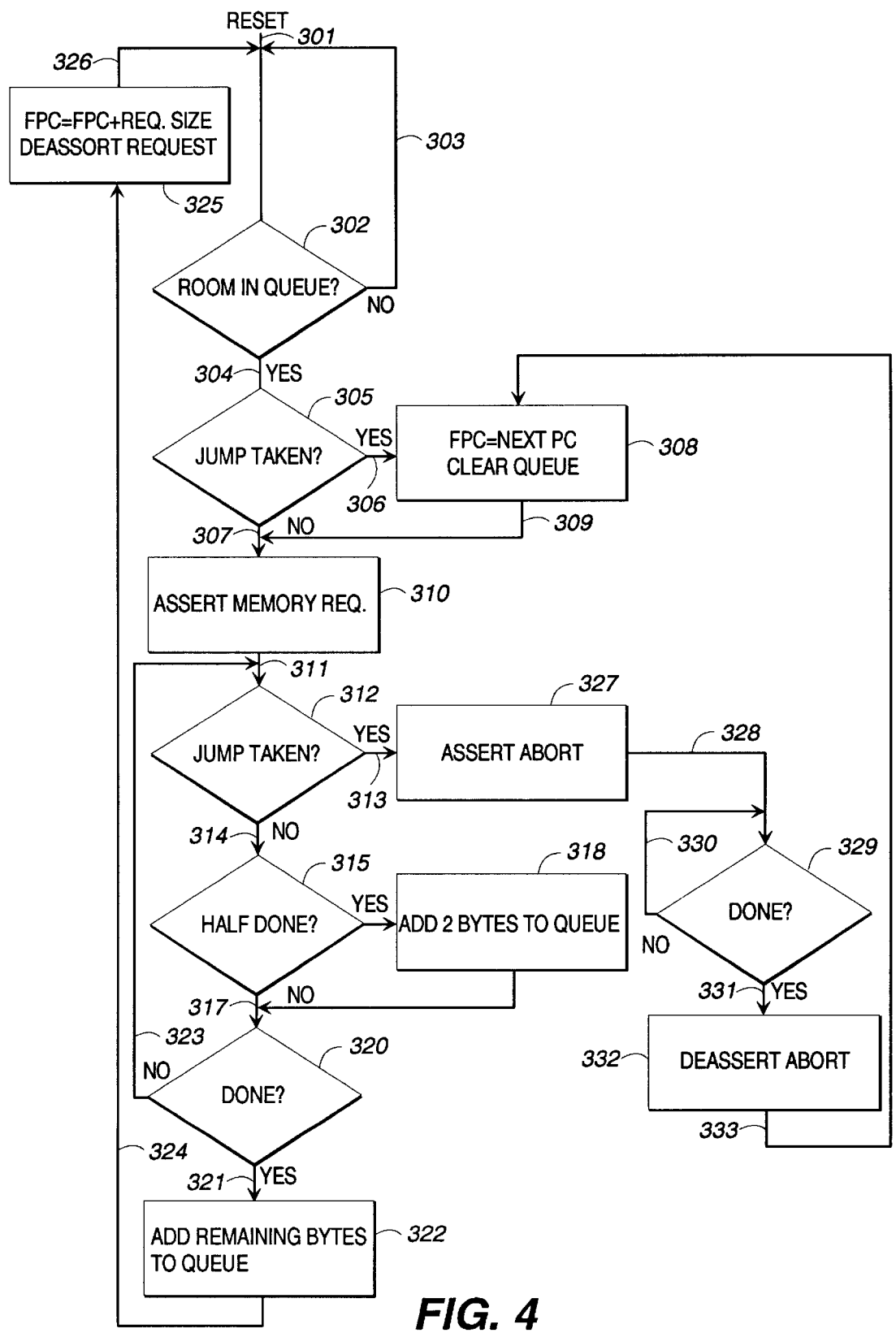
FIG. 4. illustrates a fetch control block flow chart.

The fetch stage 203 consists of a fetch control block 226, the fpc 228, an fpc incrementer 229, and a 10 byte fetch queue 230. The fpc 228 contains the address of the current memory request. The fpc incrementer 229 is used to generate the sequential addresses after fetching from the initial address of a new instruction sequence. The fetch queue 230 is used to accumulate data as it is fetched, including data fetched prior to the decode stage 202 requiring it. The fetch stage 203 will continue to make memory requests while the fetch queue 230 is not full. FIG. 4 shows a flow chart for the portion of the fetch control block 226 associated with interface 205. The portion of the fetch control block 226 associated with managing the fetch queue 230 and interface 205 is not shown. The flow charts in FIG. 4 and FIG. 5 will be described through their component arcs (lines), actions (rectangles) and decision points (diamonds).

Referring to FIG. 3 in connection with FIG. 4, the flow chart in FIG. 4 shows that the fetch control block 226 is initialized by reset through arc 301 to decision point 302. Decision point 302 will loop back to itself through arc 303 until there is enough available space in the fetch queue 230. When there is room in the queue arc 304 goes to decision point 305 to check if the jump taken signal 2 10 is asserted. If it is not asserted arc 307 is selected to action 310. If the jump taken signal 210 is asserted arc 306 is selected to action block 308, which loads the fpc 228 with the next PC field 211, and then proceeds across arc 309 to action 310 also.

Action 310 asserts the request signal 217 to the memory controller 204 and proceeds along arc 311 to decision point 312. Decision point 312 checks for the assertion of the jump taken signal 210. If the jump taken signal 210 is asserted arc 313 is selected to start the abort sequence. If the jump taken signal 210 is not asserted arc 314 is selected to decision point 315. Decision point 315 checks the half done signal 216, adding two bytes to the fetch queue in action 318 if it is asserted, and proceeding to decision block 320. Decision block 320 loops back along arc 323 if the done signal 215 is not asserted. If the done signal 215 is asserted arc 321 is selected to add the remaining bytes to the fetch queue, de-assert the request signal 217, increment the fpc to the next 4 byte boundary, and return to decision point 302.

The abort sequence initiated through arc 313 starts by asserting the abort signal 218 in action 327. Arc 328 then proceeds to decision point 329 to wait for the done signal, 215. When the done signal 215 is asserted, arc 331 proceeds to action 332, which de-asserts the abort signal 218 and the request signal 217. Arc 333 then goes to action 308 to load a new fpc from the next PC field 211, proceeding from there as described earlier. As described in this preferred embodiment, the abort signal 218 is actually an abort request, since the memory controller 204 actually determines the action to take when the abort signal 218 is asserted.

Figure 5:
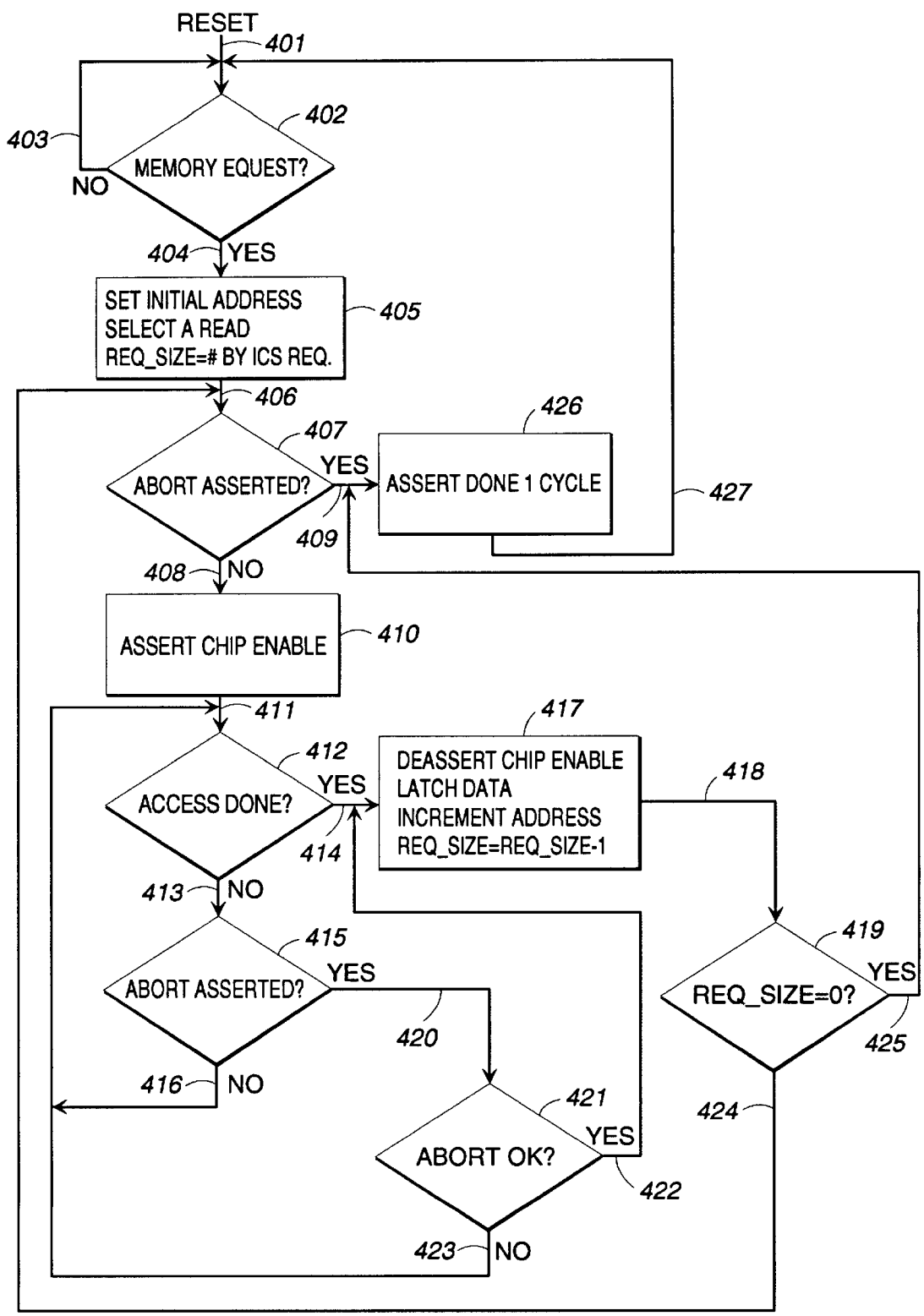
FIG. 5. illustrates a memory control block flow chart.

Referring to FIG. 3 in connection with FIG. 5, the flow chart in FIG. 5 shows that the memory control block 227 is initialized by reset through arc 401 to decision point 402. Decision point 402 waits until the memory request signal 217 is asserted and then proceeds along arc 404 to action 405. Action 405 sets the initial memory address to the value on address bus 214, sets the read/write signal 215 to read, and initializes the req_size variable to the size of the request (2 or 4 bytes). Arc 406 goes to decision point 407 to check the abort signal 218 prior to starting a memory access. If the abort signal 218 is asserted arc 409 is selected, the done signal 215 is asserted for 1 cycle, and arc 427 returns to decision point 402. If there is not an abort, arc 408 proceeds to action 410 to assert the chip enable signal 221. Arc 411 proceeds to decision point 412, which checks if the current access is done. The method used to determine when the current access is done is to count a programmable number of cycles, although those skilled in the art will recognize that other standard methods to control the timing of an access are equally applicable to this invention. If the current access is done, arc 414 proceeds to action 417 to de-assert chip enable 221, increment the memory address, and decrement the req_size variable. If req_size equals 0 in decision point 419, arc 425 proceeds to action 426 to complete the memory request as previously described. If req_size does not equal 0, then arc 424 proceeds to decision point 407 to continue processing the current memory request. If the current access is not done, arc 413 goes to decision point 415 to check the abort signal 218. At this point, if the abort signal 218 is not asserted arc 416 loops back to decision point 412, and if it is asserted arc 420 proceeds to decision point 421. Decision point 421 checks if it is okay to abort the current access. The result of this check may be based on programmable configuration bits set according to the type of memory device currently being accessed. These configuration bits could apply to all accesses, accesses to certain portions of memory, or other criteria typically used to distinguish one access from another. An example of when an abort might not be okay would be when accessing DRAM, which may be corrupted if an access is terminated abnormally. If it is not OK to abort the current access arc 427 loops back to decision point 412. If it is okay to abort the current access, arc 422 proceeds to action 417.

Figure 6:
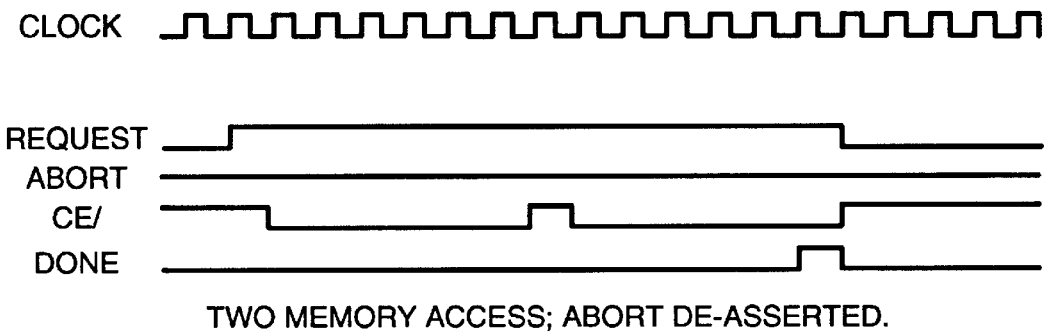
FIGS. 6, 7, 8 and 9 illustrate relative timing of memory accesses and the abort signal according to the present invention.
Figure 7:
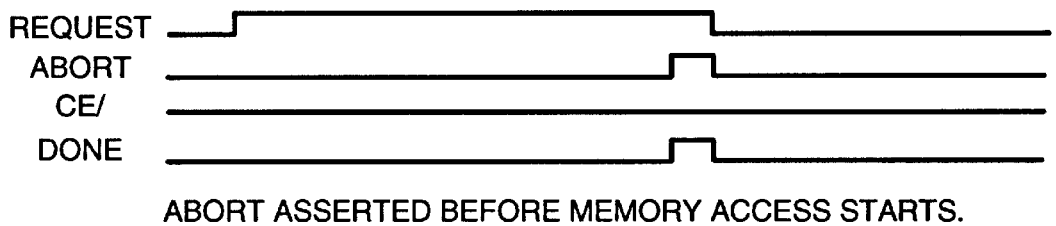
Figure 8:
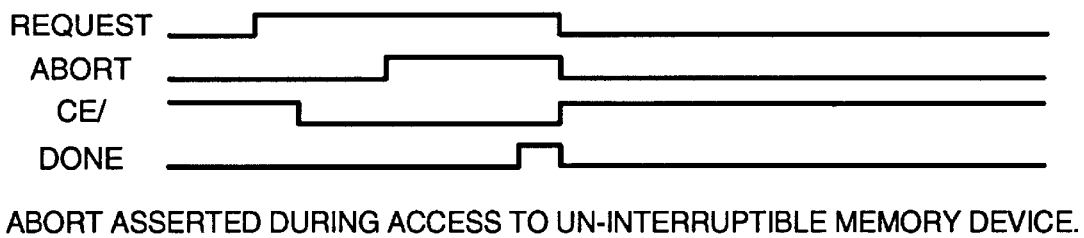
Figure 9:
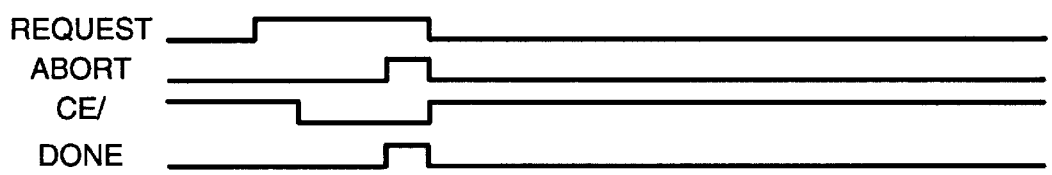

FIGS. 6–9 show timing diagrams for four of the possible sequences supported by the memory control block 227. FIG. 6 shows a normal sequence without the assertion of the abort signal 218. FIG. 7 shows the abort signal 218 asserted before a memory access starts. This sequence would involve selecting arc 409 from decision point 407. FIG. 8 shows the abort signal 218 asserted during an access to an uninterruptible memory device. This sequence would involve selecting arc 423 from decision point 421. FIG. 9 shows the abort signal 218 asserted during an access to an interruptible memory device. This sequence would involve selecting arc 422 from decision point 421.

Thus, the present invention provides an instruction decode element operating on several instruction code fetches simultaneously in a pipelined fashion, in which wasted clock cycles consumed by unneeded memory accesses are minimized over the prior art. A system using this invention will have a higher performance and dissipate less power than one that does not. The present invention achieves the above by providing a control means for terminating on-going memory accesses, and by data transfer means that allow jump instructions to be detected sooner in the decode unit.

When the decode unit determines that a discontinuity must occur in the instruction fetch sequence, it asserts a "jump taken" signal to the fetch unit to indicate that any pre-fetched instruction codes are to be discarded and that fetching is to resume at a new FPC value. If the fetch unit is currently stalled because of an outstanding request to the memory controller unit, then the fetch unit asserts an abort signal to the memory controller.

The memory controller unit interprets the abort signal to mean that the current memory access activity is to be terminated as soon as possible, such that aborting the current operation does not corrupt the stored content of the memory element. The control means will perform a fetch abort action in any of the following three instances.

In the first instance, if the abort signal is asserted at a time when the memory controller unit has not started to act upon an active request signal, then the done signal is immediately asserted to terminate the request. This situation may occur when the memory control unit is accessed through an arbitration mechanism that allocates use of the memory controller between two or more requesters. Typically, instruction fetch requests are assigned the lowest priority amongst all requesters.

Certain types of memory devices, particularly dynamic random access memories (DRAMs), require strict conformance to access timing specifications for correct operation. If the access to one of these devices is terminated prematurely, the stored content of the memory may be irreversible corrupted. Therefore, in the second instance, if the abort signal is asserted at a time when the memory control unit is performing an uninterruptible access, then the access is allowed to complete before the done signal is asserted. When the memory controller is required to make several independent accesses to satisfy one instruction code request, then the control means will eliminate any of the independent accesses which have not been started at the time that the abort signal is asserted.

Other types of memory devices are inherently non-volatile, and the stored content are not corrupted when the timing specification for a valid read access are not met. Examples are, SRAMs, mask programmed ROMs, EPROMs and Flash ROMS. Therefore, in the third instance, if the abort signal is asserted at a time when the memory control unit is performing an interruptible access, then the access is terminated immediately and the done signal is asserted. This mode of operation provides the greatest saving in otherwise wasted cycles since it eliminates whole and partial accesses.

In addition to the abort signal, the memory controller unit may assert a "partial-done" signal that informs the fetch unit that some fraction of the current request has been completed. The size of the fractional data made available to the fetch unit will correspond to some size or alignment criteria such that the fetch unit may then be able to forward one instruction code to the decode unit. If the forwarded instruction is a "taken" jump, then the decode unit will be able to abort the current fetch request sooner than if it had to wait for the full request to be satisfied.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. An integrated circuit including a digital processor that operates synchronously with respect to a periodic clock signal said digital processor coupled to a memory element external to said processor operable to access said external memory element in a given number of clock periods said digital processor including an instruction decode element, said instruction decode element comprising:

a fetch unit for performing instruction fetches from said memory element requested from a decode unit of said instruction decode element, said fetch unit having a fetch program counter for storing addresses of said instruction fetches;

a decode unit coupled to said fetch unit for decoding instructions received from said memory element therein as a result of said instruction fetches, wherein said decode unit is operable to generate a "jump taken" signal to said fetch unit when a discontinuity is to occur in a given instruction fetch sequence, said jump taken signal indicative that fetching is to resume at a new value of said fetch program counter; and a memory controller coupled to said fetch unit for performing fetch requests at given locations in said memory element, wherein said fetch unit is operable to generate an "abort" signal to said memory controller upon receipt of said jump taken signal if said memory controller has initiated an outstanding memory request to the memory element, said outstanding memory request being terminated in fewer than said given number of clock periods in response to said abort signal.

2. The integrated circuit of claim 1, wherein said memory controller is operable to generate a "partial-done" signal to said fetch unit indicative that some fraction of a current fetch request from said memory element has been completed, said fetch unit operable to forward a completed portion of said current fetch request to said decode unit upon receiving said partial done signal.

3. The integrated circuit of claim 1, further including a set of configuration bits stored in said digital processor indicative of types of memory devices coupled thereto, said configuration bits being accessible by said memory controller to determine a type of memory device being accessed, such that termination of an outstanding memory request in response to said abort signal does not corrupt the stored content of any memory element.

4. The integrated circuit of claim 3, wherein said memory controller is operable to immediately terminate an outstanding memory request to an interruptible type of memory device in response to said abort signal.

5. The integrated circuit of claim 3, wherein said memory controller is operable to allow an independent memory access to a non-interruptible type of memory device to complete prior to termination of said outstanding memory request.

6. The integrated circuit of claim 1, wherein said memory controller is operable to assert a "done" signal to said fetch unit when said memory controller is able to accept of new one of said fetch requests.

7. The integrated circuit of claim 1, wherein said jump taken signal is included in a first interface between said decode unit and said fetch unit, said first interface further including a next program counter (PC) field, wherein said decode unit initiates a new sequence of instructions by asserting said jump taken signal concurrently with an initial address of said new sequence being driven on said next PC field.

8. The integrated circuit of claim 2, wherein said digital processor includes a 32-bit data bus and is adapted to make 4-byte memory requests from said memory element at said memory controller, said partial done signal being a half done signal indicative that the first 2-bytes of said 4-byte memory request are available to said fetch unit.

9. The integrated circuit of claim 4, wherein said interruptible type of memory device is selected from the group consisting of SRAMS, mask programmed ROMs, EPROMs and Flash ROMs.

10. The integrated circuit of claim 5, wherein said non-interruptible type of memory device includes dynamic random access memories.

11. The integrated circuit of claim 1, wherein said fetch unit further includes a fetch queue, said fetch unit operable to make instruction fetch requests while said fetch queue is not full.

12. The integrated circuit of claim 1, further including an instruction execution element for executing instructions received from said decode element.

13. The integrated circuit of claim 1, wherein said jump taken signal further causes any prefetched ones of said instruction fetches to be discarded at said fetch unit.

14. A digital processor device for use in a digital data processing system having external memory elements that operates synchronously with respect to a periodic clock signal, wherein access time to said external memory elements is substantially slower than access times to internal memory elements of said digital processor, said processor comprising:

a fetch unit for performing instruction fetches requested from a decode unit of said digital processor to said external memory elements in a given number of clock periods, said fetch unit having a fetch program counter for storing addresses of said instruction fetches; and a decode unit coupled to said fetch unit for decoding instructions received therein as a result of said instruction fetches, wherein said decode unit is operable to generate a "jump taken" signal to said fetch unit when a discontinuity is to occur in a given instruction fetch sequence, said jump taken signal indicative that fetching is to resume at a new value of said fetch program counter, thereby causing any prefetched ones of said instruction fetches to be discarded; and wherein said decode element further includes a memory controller coupled to said fetch unit for performing fetch requests at given locations in said external memory elements, wherein said fetch unit is operable to generate an "abort" signal to said memory controller upon receipt of said jump taken signal if said memory controller has initiated an outstanding memory request, whereby said outstanding memory request is terminated in fewer than said given number of clock periods in response to said abort signal.

15. The device of claim 14, wherein said memory controller is operable to generate a "partial-done" signal to said fetch unit indicative that some fraction of a current fetch request has been completed, said fetch unit operable to forward a completed portion of said fetch request to said decode unit upon receiving said partial done signal.

16. The device of claim 14, further including a set of configuration bits indicative of the types of said memory elements coupled to said digital processor, said configuration bits being accessible by said memory controller to determine a type of memory device being accessed, such that termination of an outstanding memory request in response to said abort signal does not corrupt the stored content of any of said memory elements.

17. A method of operating a digital processor in order to eliminate un-needed instruction fetches, said method comprising the steps of:

transmitting instruction fetches requested by a decode unit of said digital processor from a fetch unit thereof to a memory controller;

performing fetch requests at given locations in a memory element external to said digital processor by means of said memory controller in a given number of clock periods;

decoding instructions received at said decode unit as a result of said instruction fetches;

generating a "jump taken" signal to said fetch unit of said digital processor when a discontinuity is to occur in a given instruction fetch sequence; and generating an "abort" signal to said memory controller upon receipt of said jump taken signal if said memory controller has initiated an outstanding memory request, whereby said outstanding memory request is terminated in fewer than said given number of clock periods in response to said abort signal.

18. The method of claim 17, further including the step of:

asserting a "partial-done" signal to said fetch unit indicative that some fraction of a current fetch request has been completed, said fetch unit operable to forward a completed portion of said fetch request to said decode unit upon receiving said partial done signal.

19. The method of claim 17, further including the step of accessing a set of configuration bits indicative of types of memory devices coupled to said digital processor, such that termination of an outstanding memory request in response to said abort signal does not corrupt the stored content of any memory element.

20. The method of claim 17, wherein said memory controller asserts a "done" signal to said fetch unit when said memory controller is able to accept a new one of said fetch requests.

* * * * *